April 9, 1957　　　　　　N. P. MILLAR　　　　　2,788,491
EXPANDED SCALE VOLTMETER
Filed May 3, 1952　　　　　　　　　　　　　　　　2 Sheets-Sheet 1
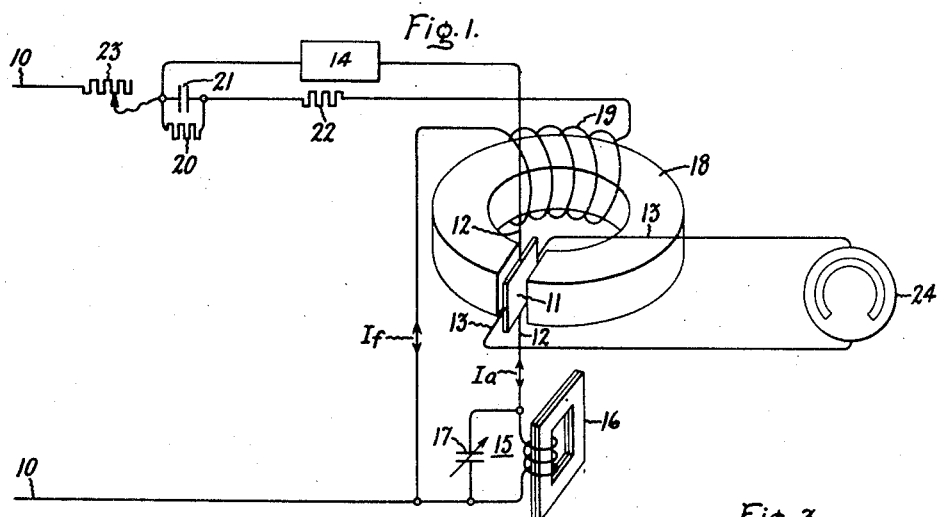
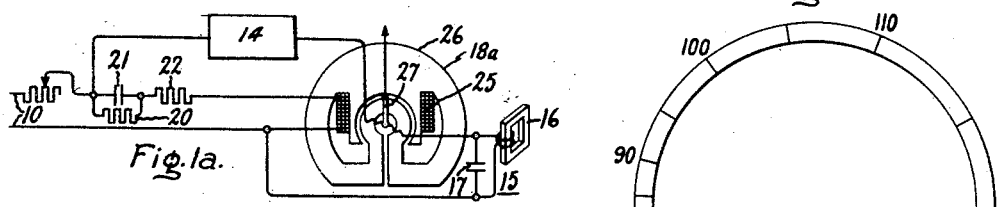
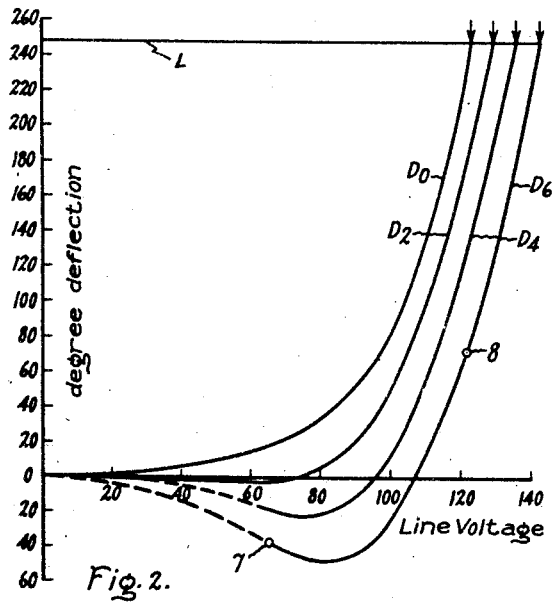
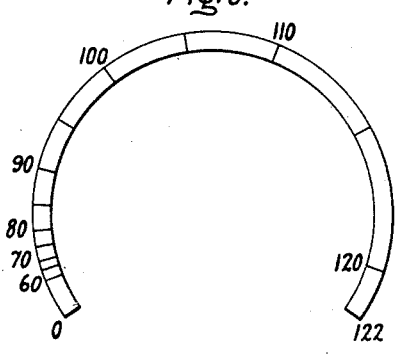
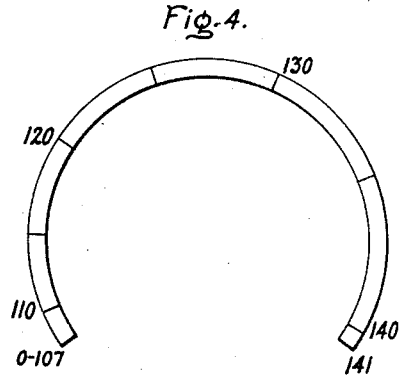
Inventor:
Norval P. Millar,
by Russell A. Warner.
His Attorney.

April 9, 1957 N. P. MILLAR 2,788,491
EXPANDED SCALE VOLTMETER
Filed May 3, 1952 2 Sheets-Sheet 2
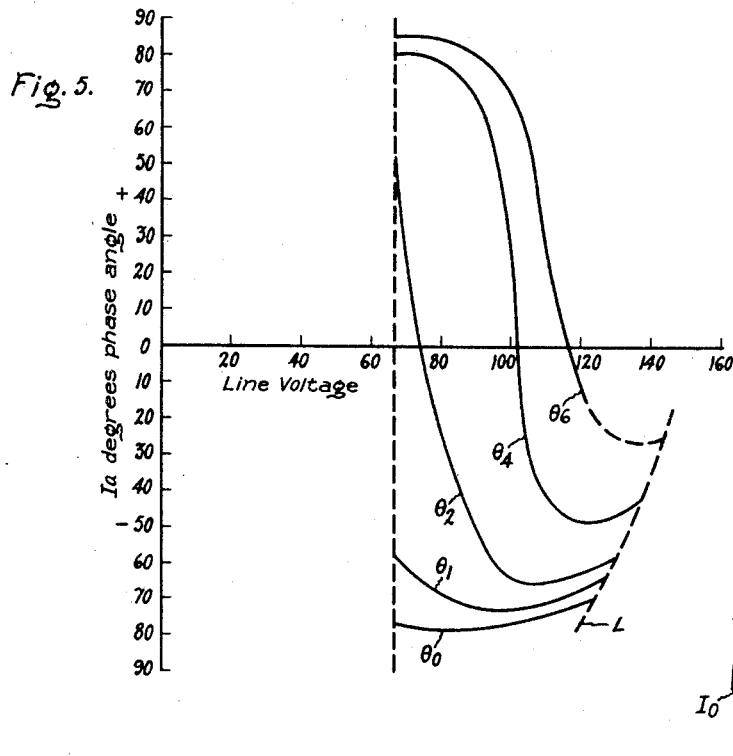
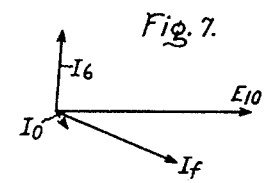
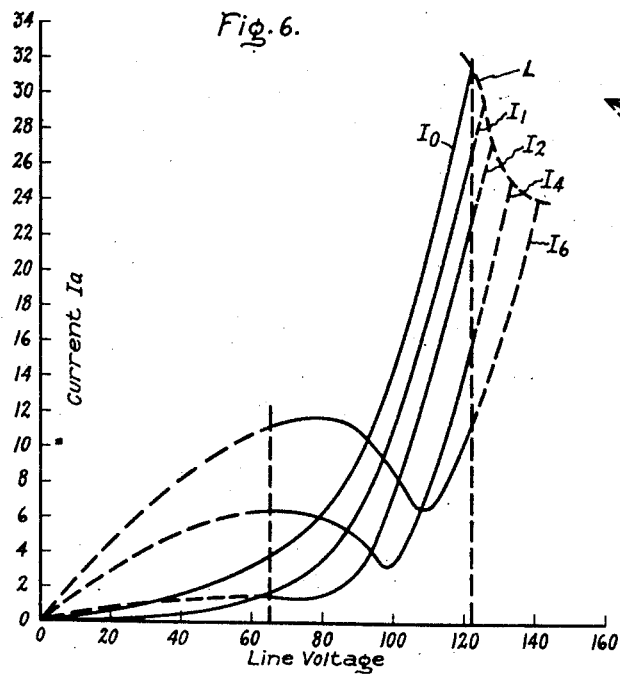
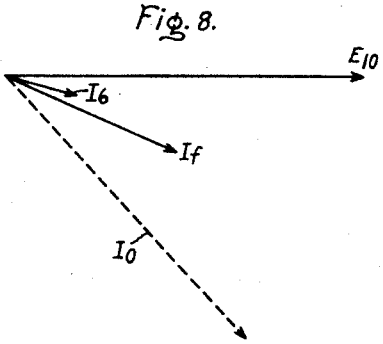
Inventor:
Norval P. Millar,
by Russell A. Warner
His Attorney.

United States Patent Office 2,788,491
Patented Apr. 9, 1957

2,788,491

EXPANDED SCALE VOLTMETER

Norval P. Millar, Danvers, Mass., assignor to General Electric Company, a corporation of New York Application May 3, 1952, Serial No. 285,951

3 Claims. (Cl. 324—131)

My invention relates to expanded scale alternating current measuring instruments such as voltmeters, and its object is to provide an instrument of this type adapted to a wide selection of expanded scale characteristics. Another object is to provide such an instrument without loss of the natural mechanical zero setting.

In carrying my invention into effect, I provide an instrument with two parallel energizing circuits, at least one of said circuits containing nonlinear and phase shifting current responsive means. The instrument used has an output, either electrical or mechanical, which is proportional to the inphase product of the currents in the two energizing circuits, and such output is controlled by the nonlinear variation of current and power factor in one of the energizing circuits and is made to reverse by causing the power factor relation between the two energizing circuits to go through zero in response to an increase in energizing voltage. The invention is applicable to both the Hall plate type of instrument and to the conventional dynamometer type of instrument.

The features of my invention which are believed to be novel and patentable will be pointed out in the claims appended hereto. For a better understanding of my invention reference is made in the following description to the accompanying drawings in which Fig. 1 represents the application of my invention using an instrument of the Hall plate type; Fig. 1a represents the application of my invention using a dynamometer type instrument; Fig. 2 shows voltage input, instrument output curves obtained with my invention, illustrating the effect of changing the variable capacitance 17 of Fig. 1, the output being plotted in terms of plus or minus instrument deflection; Figs. 3 and 4 illustrate the scale distribution obtained for the conditions depicted for curves $D_0$ and $D_6$, respectively, of Fig. 2; Fig. 5 shows curves plotted between energizing voltage and phase angle in the nonlinear phase shifting instrument circuit using different values of capacitance at 17, Fig. 1; Fig. 6 shows curves plotted between energizing voltage and current in the nonlinear phase shifting instrument circuit using different values of capacitance at 17, Fig. 1; Figs. 7 and 8 are vector diagrams showing the phase relations between currents in the instrument energizing circuit for a given value of capacitance at two different measurement voltages.

Referring now to Fig. 1, 10 represents a source of alternating current voltage to be measured by the voltmeter of my invention. The instrument used in Fig. 1 is of the Hall plate type having a Hall plate 11 with input terminals 12 and output terminals 13. The input terminals of the Hall plate are supplied from the source of voltage 10 to be measured, this energizing circuit containing impedance 15 which produces nonlinear changes in this circuit both as regards current and phase angle in response to changes in the energizing voltage. The impedance at 15 is a voltage responsive nonlinear reactance such as a saturable core reactor 16 connector in parallel with a condenser 17, represented as being variable. The Hall plate instrument also includes a field producing means, consisting of a magnetic core 18 containing an air gap in which the Hall plate 11 is located and a winding 19 on the core which constitutes the other energizing circuit of the instrument and which is also energized from the voltage source 10 to be measured. The field energizing circuit contains a current limiting resistance 22, and where the frequency is likely to vary, this circuit preferably contains a frequency compensating network consisting of a resistance 20 and condenser 21. An adjustable calibrating resistance 23 may also be provided in one of the circuit connections to both instrument energizing circuits. The nonlinear circuit preferably contains a negative temperature coefficient of resistance 14 to compensate for temperature changes. The output of the Hall plate will be a direct current voltage which is measured by the sensitive direct current instrument represented at 24 and the combination of Hall plate device and direct current instrument 24 is termed a Hall plate measuring and indicating instrument and will generally be inclosed in the same casing.

In the Hall plate instrument the field produces a flux through the Hall plate at right angles to its plane, the current input to the Hall plate is from one edge to the other, and the output from the Hall plate is taken from one edge to the other on an axis at right angles to the current input axis. Thus the input field axis, the input current axis and the output voltage axis of the Hall plate are all at right angles to each other, or substantially so. The output is proportional to the product of field flux, plate current input, and the cosine of the angle between field flux and input current. If $I_f$ designates the field current, $I_a$ the Hall plate input current, $\phi$ the phase angle between field current and input current, and D the Hall plate output, we may write the formula, $KI_fI_a \cos \phi = D$, where K is a constant depending upon the Hall effect in the plate material employed. A Hall plate made of germanium ¼ in. by ¼ in. square and 0.025 in. thick is satisfactory.

At constant frequency the current $I_f$ in the field winding 19 varies directly and linearly with the line voltage 10, and its phase angle with respect to line voltage is constant and, due to the reactance of the field winding, is somewhat lagging. However, the current $I_a$ through the Hall plate varies nonlinearly with the line voltage, and its phase angle varies very appreciably, due to the nonlinear impedance device in this circuit. To give practicable illustrations of the use of my invention, it will be assumed that it is desired to measure 60-cycle voltages over expanded scale ranges of the order of from 100 to 140 volts. The nonlinear phase-shifting device 15 will therefore be designed to respond, as will be hereinafter described, primarily over the expanded scale ranges to be discussed.

Refer now to Fig. 6 where I have shown the relation between plate input current $I_a$ and line voltage 10 for various values of capacitance at 17, and with a saturable core reactor at 16 containing eight laminations of 0.014 in. silicon steel ¼ in. wide and 7400 turns of 0.004 in. copper wire in the winding. Curve $I_0$, which is included for explanatory comparison purposes, represents the current $I_a$ at different voltages with the capacitance at 17 reduced to zero, and shows merely the nonlinear increase in current with voltage, due to the saturation and corresponding decrease in reactance of the saturable core reactance 16. Curves $I_1$, $I_2$, $I_4$, and $I_6$ represent the current $I_a$ with values of capacitance at 17 of 0.1, 0.2, 0.4 and 0.6 microfarad, respectively. It is seen that the capacitance nullifies the effective impedance in the circuit to a more or less extent at the lower voltages before the reactor impedance predominates and allows more current to flow. This accounts for the steeper rise in curve $I_6$ as compared to $I_0$ below 60 volts, for example. When the circuit contains substantial capacitance, a condition approaching resonance between reactor 16 and condenser 17 occurs as the voltage applied increases, thereby reducing the through current in the circuit. This is most noticeable for curves $I_4$ and $I_6$ at about 100 and 110 volts, respectively. Then upon a further rise in voltage, reactor 16 becomes more saturated, the capacitance loses control, and the $I_a$ current rises rapidly.

The output of the instrument is not determined by the $I_a$ current alone but also by its phase relation with respect to $I_f$ and the magnitude of the latter. In Fig. 5, I have shown by curves the changes in phase angle of the $I_a$ current with changes in line voltage for the different values of capacitance at 17 previously specified for the curves of Fig. 6. The ordinates of Fig. 5 represent the phase angle, designated $\theta$, of the current $I_a$ with respect to line voltage. The curves of Fig. 5 have been plotted only over the expansion scale range of interest in the problem used for illustration purposes. Curve $\theta_0$ shows the phase of the current $I_a$ at different line voltages when the capacitance at 17 is zero. Curves $\theta_1$, $\theta_2$, $\theta_4$ and $\theta_6$ show the phases of the currents $I_a$ at different line voltages when the capacitances used at 17 are 0.1, 0.2, 0.4 and 0.6 microfarad, respectively. It is seen that the capacitance 17 in parallel with reactor 16 has a very marked influence on the phase angle of the $I_a$ current, and that for any given value of capacitance the phase angle of the $I_a$ current changes very materially with changes in voltage over the voltage range where the capacitance exercises this control. For example, using a 0.4 microfarad condenser, curve $\theta_4$, the phase angle changes from about 82 degrees leading at 65 volts to about 50 lagging at about 121 volts. As reactor 16 in parallel with condenser 17 saturates, the condenser control diminishes and the phase angle of the $I_a$ current becomes lagging in the manner represented. The extent to which the condenser modifies the magnitude and phase angle of the $I_a$ current varies with the value of capacitance used as is well represented by Figs. 6 and 5, respectively.

It is seen that the effect of the saturable reactor 16 and capacitor 17 is to change greatly the phase angle of the $I_a$ current, and thereby cause an effective magnitude suppression of the $I_a$ current over a range of applied voltage that would normally never occur if capacitance 17 were removed.

The result of this behavior in the $I_a$ current when combined in the instrument with the $I_f$ current (which increases in proportion to the voltage with not much change in phase angle) is to produce an instrument output which is generally negative at voltages below the selected expanded scale range and which is positive and increases sharply with rise in voltage over the selected expanded scale range. The cosine of the phase angle between the two energizing currents changes from a minus value to a plus value as the voltage increases from below to within the measurement range. The voltage input-instrument output characteristics for different values of capacitance are represented in the curves of Fig. 2, the output ordinate scale used being in terms of degrees instrument deflection from zero. In the case of the Hall plate instrument, Fig. 1, the output is direct current as measured by the long scale direct current instrument at 24 in terms of its deflection.

Fig. 7 is a vector diagram representing approximately the phase relation of line voltage $E_{10}$, field current $I_f$, and Hall plate or armature current $I_6$ for a line voltage of 65 volts and a value of capacitance at 17, Fig. 1, of 0.6 microfarad. It is seen that the currents $I_6$ and $I_f$ are more than 90 degrees out of phase, corresponding to a negative power factor condition, and hence, the instrument will produce a negative output as compared to a condition when this angle between $I_6$ and $I_f$ is less than 90 degrees. In Fig. 1 the direct current instrument 24 will be connected to the Hall plate output terminals 13 to produce a negative or below zero deflection under this condition, although it preferably will have a pointer stop just below the zero deflection point to prevent possible damage to the instrument.

Fig. 8 is a vector diagram corresponding in all respects to the conditions of Fig. 7 except that the line voltage $E_{10}$ has been increased to 121 volts. Field current vector $I_f$ has increased accordingly and has the same phase angle as in Fig. 7. The $I_6$ current has approximately the same value as in Fig. 7, but its phase angle has changed greatly and is now only slightly out of phase with $I_f$. The output of the instrument will thus be positive and greatly increased as compared to Fig. 7. The direct current output of the Hall plate will be reversed and positive and correspondingly increased as compared to Fig. 7, and a large positive instrument deflection at 24 will result. Figs. 7 and 8 correspond to points 7 and 8, respectively, of the instrument input-deflection output curve $D_6$, Fig. 2, and the scale expansion characteristics obtained with this particular combination on a 250-degree full scale instrument 24 are shown in Fig. 4 where the scale is calibrated and marked in terms of line voltage $E_{10}$ and not deflection angle. In Figs. 7 and 8, I have also included the vector $I_0$ to show the general phase angle and magnitude of the $I_a$ current at the two voltages specified, when there is no capacitance at 17. These $I_0$ vectors when combined with the $I_f$ vector will always produce a positive output according to curve $D_0$, Fig. 2, and a scale distribution represented in Fig. 3, and is included for comparison and explanatory purposes.

Curves $D_2$ and $D_4$, Fig. 2, show the instrument voltage input-degrees deflection output of the instrument of Fig. 1, where the capacitance at 17 is made 0.2 and 0.4 microfarad, respectively. It is evident that curve $D_2$ will produce a scale calibration where the scale expansion and calibration are over approximately the 70 to 125 voltage range, and that curve $D_4$ will produce a scale calibration where the scale expansion and calibration are over approximately the 95 to 135 volt range. Below these ranges the outputs will be negative and the reading suppressed. The upper portions of their scales will be more expanded than the lower part, and this will be more pronounced in the instrument using the higher capacitance. The dotted lines L in Figs. 5 and 6 and the horizontal line L, Fig. 2, indicate the locus of the 250-degree scale deflection pointer positions for the several conditions described. Thus, referring to the instrument having the capacitance 0.6 microfarad at 17, it will have a full scale 250-degree deflection at approximately 141 volts, 23.5 milliamperes $I_6$ (Fig. 6) when the phase angle of $I_6$ is about 25 degrees lagging with respect to line voltage of 141 volts (Fig. 5). It will be apparent that except for the scale calibration, the instrument 24 of Fig. 1 may be a conventional direct current long-scale sensitive measuring instrument with a normal zero point at the left end of the scale, and with the usual return spring and zero pointer set arrangement. While a large negative portion of the possible deflection is suppressed, this is not, strictly speaking, a suppressed zero instrument but one which retains the advantages of the conventional mechanical zero setting at zero voltage for calibration purposes.

In Fig. 1a there is shown the application of my invention to an instrument of the dynamometer type. The instrument 18a which takes the place of the Hall plate instrument and indicator 24 of Fig. 1 is essentially a long-scale alternating current wattmeter structure with a relatively high resistance many-turn current field winding 25 to adapt it for voltage excitation, and it takes the place of the field winding 19 of Fig. 1. The field winding excites a laminated core 26 having an outer pole piece concentric with an inner pole piece. The inner pole piece is split and has a center opening as shown so as to mount the moving armature coil 27 with its inner edge in the central opening in the inner pole piece and its outer edge in the air gap between the concentric field pole surfaces. This is a conventional alternating current wattmeter design except for the many-turn field winding 25. The armature is pivoted on the center axis and has flexible lead-in spirals which serve as a zero return spring. The moving armature coil is connected in the nonlinear phase shifting circuit by connections which correspond to the input connections 12 of the Hall plate instrument of Fig. 1. The input energizing circuits to the dynamometer type wattmeter of Fig. 1a are in all respects similar to the input energizing circuits of the Hall plate instrument of Fig. 1, with the possible exception of change in the value of circuit components to best adapt the principles of the invention to the forms of instruments used in each case.

The output of the instrument of Fig. 1a will be a direct mechanical deflection of the instrument pointer but as in Fig. 1 will be proportional to the product of the field current $I_f$, the armature current $I_a$, and the cosine of the angle between their phase vectors, and hence, changes in the value of the capacitance used at 17 will produce scale expansion results similar to those explained in connection with Fig. 1. The instrument of Fig. 1a will have a normal mechanical zero, a negative deflection torque over that part of the voltage range which is suppressed, and a positive torque and deflection over the desired expanded scale range which is of course calibrated in voltage. Under negative torque negative power factor output conditions the pointer may rest against a stop just below the natural zero point.

The invention permits of expanded scale instrument designs where the scale expansion over the useful range is more uniform than has been obtained heretofore. This greater uniformity is obtained by the use of capacitance 17 in shunt to the nonlinear reactor 16, and is subject to modification by the use of different values of capacitance.

Likewise, the invention permits of controlling the full scale rating of a given design of expanded scale voltmeter during calibration by a change in capacitance, and by changing the resistance 23, Figs. 1 and 1a, the full scale voltage rating may be changed without changing the expanded scale characteristics.

The invention is applicable to either the Hall plate type of instrument or the dynamometer type of instrument without loss of mechanical zero. Frequency and temperature compensation may be used, if desired, without interference with expanded scale characteristics.

What I claim as new and desire to secure by Letters Patent of the United States is:

1. An expanded scale alternating current voltmeter comprising a measuring and indicating instrument having two energizing circuits energized in parallel from the voltage to be measured, said instrument being of a type which has a measurement response proportional to the product of the currents in its energizing circuits and the cosine of the phase angle between such currents, an impedance consisting of a capacitor and a nonlinear reactor connected in parallel in series in one of said energizing circuits, said impedance causing the cosine of the phase angle of the currents in the two energizing circuits to change from minus to plus as the energizing voltage increases from below to within the measurement range of said instrument and the magnitude of the current in the impedance energizing circuit first to decrease and then to increase as the voltage increases within the measurement range of said instrument, said instrument including a scale having a zero voltage graduation and above zero graduations covering the measurement range and a pointer cooperating with said scale which indicates on zero when the voltage is zero and tends to indicate below zero when the voltage is above zero but below the measurement range.

2. An alternating current measuring and indicating instrument having a moving pointer and a graduated scale on which the pointer indicates, said scale having an upper end scale graduation corresponding to the 100 percent voltage rating of said instrument and a lower end scale graduation corresponding to between 50 and 75 percent of the full scale voltage rating of said instrument, said lower end graduation also being the zero voltage indicating position of said pointer, said instrument tending to indicate below zero for voltages between zero and the voltage corresponding to the lower end scale graduation, said instrument having two energizing circuits connected in parallel to the voltage to be measured and a measurement response which is proportional to the product of the currents in its energizing circuits and the cosine of the phase angle between such currents, and a voltage responsive phase shifting impedance means included in one of the energizing circuits of said instrument for causing the cosine of the phase angle between the two energizing currents of said instrument to change from a negative value to a positive value as the energizing voltage is increased from below to above the voltage corresponding to the lower end scale graduation of said instrument.

3. An expanded scale alternating current voltmeter comprising an electromagnet containing an air gap, a Hall plate positioned in said air gap and having input and output terminals, an energizing circuit for said electromagnet and an energizing circuit for the input terminals of said Hall plate, means for connecting said energizing circuits in parallel to the voltage to be measured, a direct current indicating instrument connected to be energized from the output terminals of said Hall plate and graduated to indicate the positive output of said Hall plate in terms of the voltage to be measured, and voltage responsive phase shifting means in the Hall plate input energizing circuit for causing the output of said Hall plate to change from a negative value to a positive value as the voltage to be measured increases from below to above a value greater than 50 percent of the maximum voltage calibration of said scale.

References Cited in the file of this patent

UNITED STATES PATENTS

| | | |
|---|---|---|
| 1,778,795 | Craig | Oct. 21, 1930 |
| 1,952,072 | Jewell | Mar. 27, 1934 |
| 1,994,324 | Suits | Mar. 12, 1935 |
| 2,578,441 | Millar | Dec. 11, 1951 |

FOREIGN PATENTS

| | | |
|---|---|---|
| 604,985 | Germany | Nov. 1, 1934 |
| 708,812 | Germany | June 19, 1941 |